(12) United States Patent
Zhao et al.

(10) Patent No.: US 10,587,082 B1
(45) Date of Patent: Mar. 10, 2020

(54) NETWORK CONNECTION DEVICE

(71) Applicant: Huizhou Durwy Intelligent Technology Co., Ltd., GuangDong (CN)

(72) Inventors: Ligang Zhao, GuangDong (CN); Youhe Zhang, GuangDong (CN); Haifei Liang, GuangDong (CN); Guangming Song, GuangDong (CN); Lei Liang, GuangDong (CN)

( * ) Notice: Subject to any disclaimer, the term of this patent is extended or adjusted under 35 U.S.C. 154(b) by 0 days.

(21) Appl. No.: 16/392,647

(22) Filed: Apr. 24, 2019

(30) Foreign Application Priority Data

Mar. 20, 2019 (CN) ..................... 2019 2 0352586 U

(51) Int. Cl.
*H01R 27/02* (2006.01)
*G06F 13/38* (2006.01)

(52) U.S. Cl.
CPC ........... *H01R 27/02* (2013.01); *G06F 13/385* (2013.01); *G06F 2213/0042* (2013.01)

(58) Field of Classification Search
CPC ... H01R 27/02; G06F 13/385; G06F 13/4282; G06F 1/3287
USPC ........................................................ 439/638
See application file for complete search history.

(56) References Cited

U.S. PATENT DOCUMENTS

| | | | | |
|---|---|---|---|---|
| 7,622,679 B2* | 11/2009 | Huang | ..................... | H01B 7/04 174/107 |
| 8,038,461 B2* | 10/2011 | Hsu | ........................ | H01R 4/023 439/344 |
| 8,974,242 B2* | 3/2015 | Lee | ..................... | H01R 13/5833 439/278 |
| 10,218,127 B2* | 2/2019 | Lee | ......................... | H01R 12/53 |
| 2016/0364360 A1* | 12/2016 | Lim | ....................... | G06F 13/385 |
| 2017/0040761 A1* | 2/2017 | Tsai | ..................... | H01R 13/642 |
| 2017/0062991 A1* | 3/2017 | Lee | ..................... | H01R 13/6591 |
| 2018/0040969 A1* | 2/2018 | Wu | ..................... | H01R 13/6593 |
| 2018/0115113 A1* | 4/2018 | Lin | ........................ | H01R 4/2429 |
| 2018/0143916 A1* | 5/2018 | Gupta | ..................... | G06F 13/102 |
| 2018/0232323 A1* | 8/2018 | Ghosh | ................... | G06F 13/385 |
| 2018/0241154 A1* | 8/2018 | Khorrami | ........... | H01R 13/639 |

(Continued)

FOREIGN PATENT DOCUMENTS

JP 2002352640 A * 12/2002

*Primary Examiner* — Tulsidas C Patel
*Assistant Examiner* — Peter G Leigh
(74) *Attorney, Agent, or Firm* — Prakash Nama; Global IP Services, PLLC

(57) ABSTRACT

The present invention discloses a network connection device. The network connection device includes a plug and a socket; the plug includes network cables, an encapsulation portion and a Universal Serial Bus interface; one end of the encapsulation portion is connected with the network cables, and the other end of the encapsulation portion is connected with the USB interface; and the socket is matched with the USB interface. Compared with the existing network connection device, the plug of the network connection device provided by the present invention is disposed by adopting the USB interface and particularly a Type-C interface and may be plugged forward and backward, so the network connection device not only is plugged conveniently, but also is small and exquisite, has a stable signal and does not cause an unstable network connection due to a failure of one signal pin to affect the signal transmission.

6 Claims, 4 Drawing Sheets

| 12 pins on front side | A1 | A2 | A3 | A4 | A5 | A6 | A7 | A8 | A9 | A10 | A11 | A12 |
|---|---|---|---|---|---|---|---|---|---|---|---|---|
| 12 pins on front side | B12 | B11 | B10 | B9 | B8 | B7 | B6 | B5 | B4 | B3 | B2 | B1 |
| Corresponding network cable | Orange white | Orange | Green white | | Blue | | Blue white | | Green | | Brown white | Brown |

(56) References Cited

U.S. PATENT DOCUMENTS

2018/0356873 A1* 12/2018 Regupathy ............ G06F 1/3253
2019/0073329 A1*  3/2019 Tao ...................... G06F 5/065
2019/0110119 A1*  4/2019 Yoshino ................ H01Q 1/46

* cited by examiner

| 12 pins on front side | A1 | A2 | A3 | A4 | A5 | A6 | A7 | A8 | A9 | A10 | A11 | A12 |
|---|---|---|---|---|---|---|---|---|---|---|---|---|
| 12 pins on front side | B12 | B11 | B10 | B9 | B8 | B7 | B6 | B5 | B4 | B3 | B2 | B1 |
| Corresponding network cable | Orange white | Orange | Green white | | Blue | | Blue white | | Green | | Brown white | Brown |

NETWORK CONNECTION DEVICE

BACKGROUND OF THE INVENTION

The present invention relates to the field of network connection devices, and in particular to a network connection device.

Along with the continuous development of a network electronic device, a conventional network connection device has been unable to meet the fine and precise development of the electronic device. Generally, a Registered Jack (RJ) 45 connector (computer network information jack connector, also referred to as 8P8C (8 position 8 contact)) is adopted by the conventional network connection device; the RJ45 connector includes a plug (connector and crystal head) and a socket (module), the plug is provided with eight grooves and eight contacts; and the plug is connected with network cables. The plug and the socket of the RJ45 are large in size, and the network cables connected by the plug are rough and have poor bendability. Furthermore, eight signal pins of each of the plug and the socket of the RJ45 are arranged on one side, have a fixed splicing direction and cannot be spliced forward and backward at random.

In addition, the plug and the socket of the RJ45 are only provided with the eight signal lines to correspond to eight signal lines of the network cables. Along with the aging of the product in use, the contact performance of the signal pins is gradually declined; and in an increasingly popular kilo-mega network, if the contact of one signal pin is in failure, the network connection is unstable to affect the transmission of a signal.

BRIEF SUMMARY OF THE INVENTION

The technical problem to be solved by the present invention is to provide a network connection device, thereby solving the problem that an existing network connector cannot meet the fine and precise development of an electronic device and is frequent to cause an unstable network connection in use to affect signal transmission.

In order to solve the above technical problems, the technical solutions of the present invention are as follows: a network connection device includes a plug and a socket; the plug includes network cables, an encapsulation portion and a Universal Serial Bus (USB) interface; one end of the encapsulation portion is connected with the network cables, and the other end of the encapsulation portion is connected with the USB interface; and the socket is matched with the USB interface.

Preferably, the USB interface is a Type-C interface, and the socket is a Type-C interface socket.

Preferably, a Printed Circuit Board (PCB) is disposed inside the encapsulation portion; the PCB board is designed by adopting a double-backup circuit mode; and the PCB board is connected with the network cables.

Preferably, the PCB board is designed in the double-backup circuit mode to respectively provide 12 pins on front and reverse sides, that is, the 12 pins on the front side of the PCB board (6) include A1, A2, A3, A4, A5, A6, A7, A8, A9, A10, A11 and A12, and the 12 pins on the reverse side of the PCB board (6) include B12, B11, B10, B9, B8, B7, B6, B5, B4, B3, B2 and B1; the A1 and the B12 are disposed oppositely and both are respectively connected with an orange-white network cable; the A2 and the B11 are disposed oppositely and both are respectively connected with an orange network cable; the A3 and the B10 are disposed oppositely, the A4 and the B9 are disposed oppositely and all are respectively connected with a green-white network cable; the A5 and the B8 are disposed oppositely, the A6 and the B7 are disposed oppositely and all are respectively connected with a blue network cable; the A7 and the B6 are disposed oppositely, the A8 and the B5 are disposed oppositely and all are respectively connected with a blue-white network cable; the A9 and the B4 are disposed oppositely, the A10 and the B3 are disposed oppositely and all are respectively connected with a green network cable; the A11 and the B2 are disposed oppositely and both are respectively connected with a brown-white network cable; and the A12 and the B1 are disposed oppositely and both are respectively connected with a brown network cable.

Preferably, an encapsulation tail portion with a protective effect is disposed at the junctions of the encapsulation portion and the network cables.

Preferably, the encapsulation portion and the encapsulation tail portion are connected seamlessly; and the encapsulation portion and the encapsulation tail portion are subject to low-pressure injection moulding.

Preferably, a protective layer is disposed on an outer surface of the encapsulation portion; and the protective layer is subject to the low-pressure injection moulding.

Preferably, the protective layer is made of a Thermo Plastic Elastomer (TPE) material; and the encapsulation portion is made of a Low Density Polyethylene (LDPE) material.

Preferably, the network cables are superfine network cables.

Preferably, an overall outer diameter of the network cables is 2-3 mm.

The present invention implements the following beneficial effects: compared with the existing network connection device, the plug of the network connection device provided by the present invention is disposed by adopting the USB interface and particularly the Type-C interface and may be plugged forward and backward, so the network connection device not only is plugged conveniently, but also is small and exquisite, has a stable signal and does not cause an unstable network connection due to a failure of one signal pin to affect the signal transmission; and thus, the reliability of the network connection is greatly improved; meanwhile, with the USB interface, the universality among devices may be greatly improved and the network connection device is applied to more miniature electronic devices; the encapsulation portion of the plug and the encapsulation tail portion are subject to the low-pressure injection moulding, so that secondary encapsulation is implemented, and the product quality may be ensured, thereby being durable; furthermore, the network cables of the network connection device are the superfine network cables, so compared with the traditional network cables, the bending performance is excellent and the carriage is more convenient; and the network cables may further be directly encapsulated with the plug together to simplify the production procedures.

Figure 1:
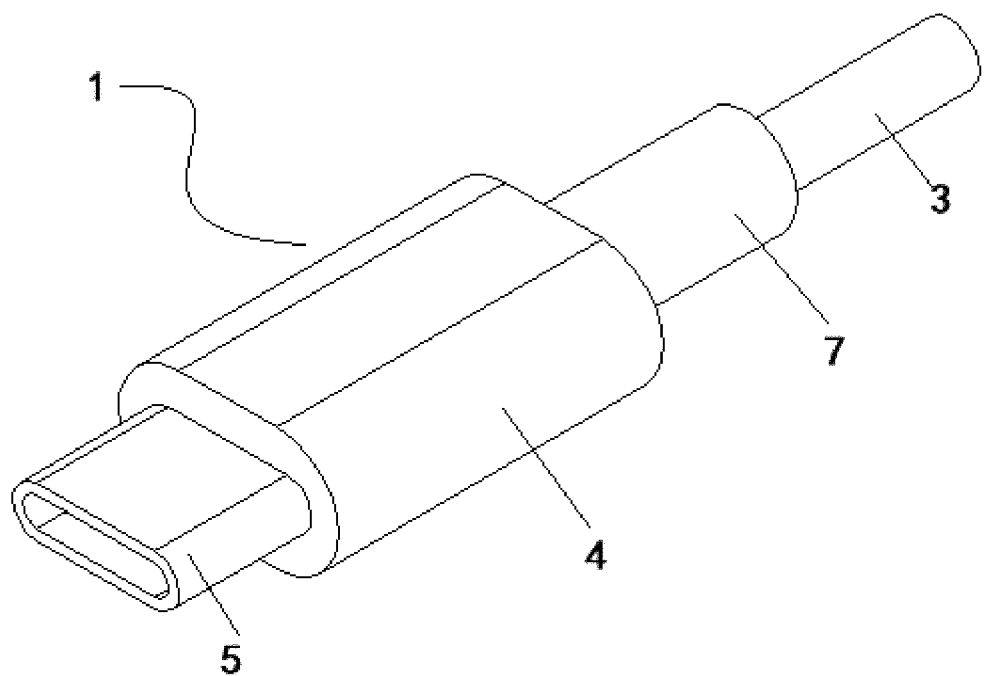
FIG. 1 illustrates a stereoscopic diagram of a plug of a network connection device provided by the present invention.

Names of corresponding components or procedures represented by figures or letters in the drawings: 1. plug; 2. socket; 3. network cable; 4. encapsulation portion; 5. USB interface; 6. PCB board; 7. encapsulation tail portion; 8. pin; 9. pin contact plate.

The accompanying drawings are merely for exemplary description and cannot be understood as limits to the present invention. In order to better describe an embodiment, some components in the drawings may be omitted, amplified or zoomed out and do not represent the size of an actual product. For a person skilled in the art, it may be understandable that some well-known structures and descriptions may be omitted in the drawings. Same or similar numerals correspond to same or similar components. Terms for describing a positional relationship in the drawings are merely for exemplary description and cannot be understood as limits to the present invention.

DETAILED DESCRIPTION OF THE INVENTION

In order to facilitate the understanding of the person skilled in the art, the present invention will be further described below in detail in combination with drawings and embodiments, and is specifically described as follows.

A network connection device includes a plug 1 and a socket 2; the plug 1 includes network cables 3, an encapsulation portion 4 and a USB interface 5; one end of the encapsulation portion 4 is connected with the network cables 3, and the other end of the encapsulation portion 4 is connected with the USB interface 5; and the socket 2 is matched with the USB interface 5. The USB interfaces are mainly divided into USB-A/B/C types based on shapes. Type-A: such interfaces are the common standard USB large interfaces and the mainstream interfaces may be USB 2.0 (dozens of M/S) and USB 3.0 (hundreds of M/S); and as a matter of fact, a few of Type-A at present are USB3.1 that may be up to 10 Gbps and are often seen on a new desktop mainboard. Type-B: such interfaces are often seen on a printer as well as a display having a touch and a USB interface. Type-C: such interfaces are charge/data interfaces for a majority of mobile phones at present, and some are simultaneously used as earphone interfaces of the mobile phones such as Letv and MI as well as video output interfaces such as Huawei Mate 10, Samsung S8/S9, Lumia950, Nut R1 and Pro2S; furthermore, some are also computer interfaces such as interfaces of Apple whole series of new notebooks after 12-inch Macbook in 2015. In this embodiment, the USB interface 5 is a Type-C interface, and the socket 2 is a Type-C interface socket.

Figure 2:
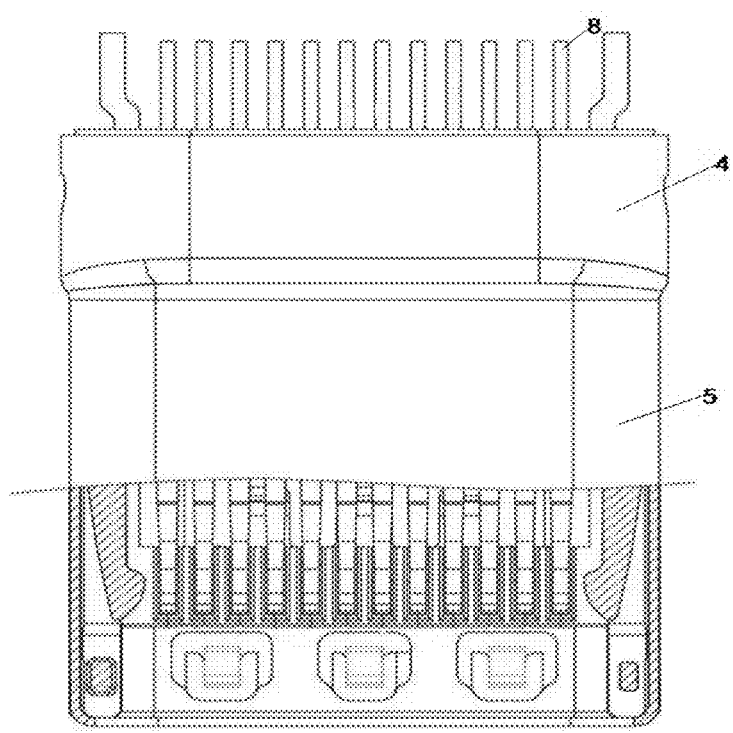
FIG. 2 illustrates an internal cross-sectional view of an encapsulation portion and a USB interface of a network connection device provided by the present invention.
Figure 3:
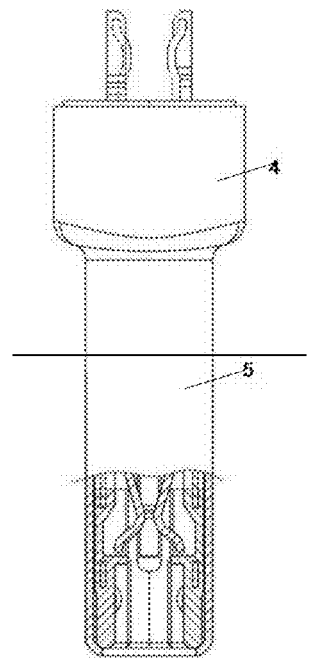
FIG. 3 illustrates an internal cross-sectional side view of an encapsulation portion and a USB interface of a network connection device provided by the present invention.
Figure 4:
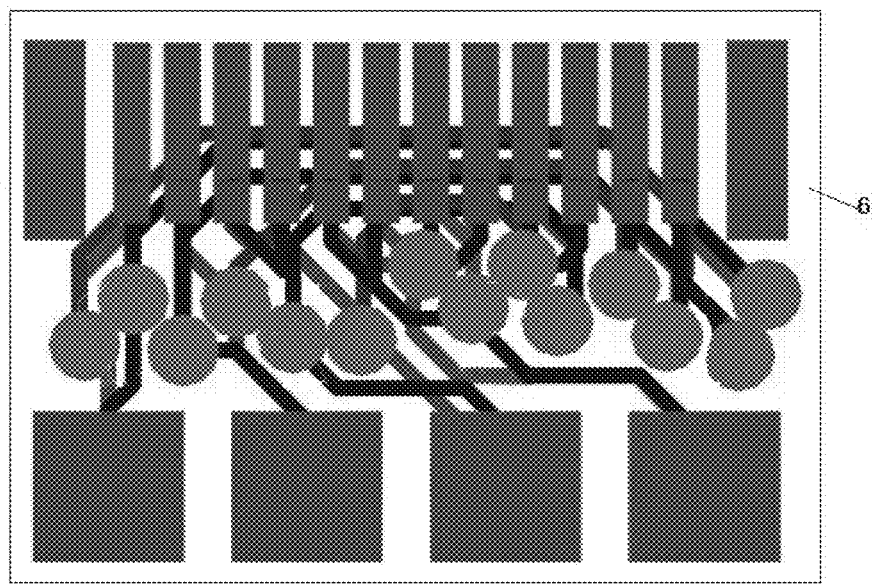
FIG. 4 illustrates a top view of a part of printed circuits of a PCB board inside a plug of a network connection device provided by the present invention.
Figures 5, 6:
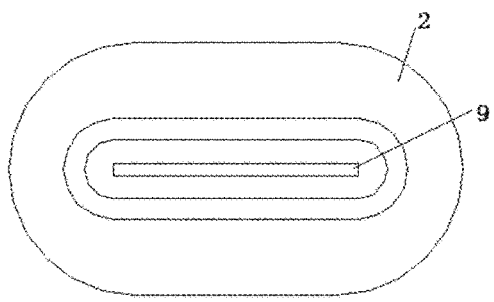
FIG. 5 illustrates a top view of a socket of a network connection device provided by the present invention.
FIG. 6 illustrates a table of corresponding network cables, connected in a double-backup circuit mode, of a PCB board of a socket of a network connection device provided by the present invention.

Specifically, a PCB board 6 is disposed inside the encapsulation portion 4, a double-backup circuit mode is adopted by the PCB board 6 and the PCB board 6 is respectively connected with the network cables 3 and pins 8 inside the encapsulation portion 4. The network cables 3 are superfine network cables and generally eight network cables are provided for a connection of an electronic device. Traditionally, the network cables are rough and an outer diameter for eight internal wires is 5-8 mm in general, which is not beneficial to a small electronic device. However, for the superfine network cables, the overall outer diameter for eight internal wires is only 2-3 mm. In this embodiment, the Type-C interface is adopted and up to 24 pairs of pins are corresponding to the Type-C interface. With the design of the PCB board, rich redundancy may be provided. As shown in FIGS. 2-4, eight pins are provided on the PCB board and are just corresponding to eight internal wires having different colors inside the network cables, and the pins inside the encapsulation portion 4 are respectively connected with the USB interface 5 and the PCB board 6. Moreover, with the double-backup circuit mode design of the PCB board, as shown in FIG. 6, eight internal wires having different colors are provided inside correspondingly connected network cables. In this embodiment, the PCB board is designed in the double-backup circuit mode to respectively provide 12 pins on front and reverse sides, that is, the 12 pins on the front side of the PCB board include A1, A2, A3, A4, A5, A6, A7, A8, A9, A10, A11 and A12, and the 12 pins on the reverse side of the PCB board include B12, B11, B10, B9, B8, B7, B6, B5, B4, B3, B2 and B1; the A1 and the B12 are disposed oppositely and both are respectively connected with an orange-white network cable; the A2 and the B11 are disposed oppositely and both are respectively connected with an orange network cable; the A3 and the B10 are disposed oppositely, the A4 and the B9 are disposed oppositely and all are respectively connected with a green-white network cable; the A5 and the B8 are disposed oppositely, the A6 and the B7 are disposed oppositely and all are respectively connected with a blue network cable; the A7 and the B6 are disposed oppositely, the A8 and the B5 are disposed oppositely and all are respectively connected with a blue-white network cable; the A9 and the B4 are disposed oppositely, the A10 and the B3 are disposed oppositely and all are respectively connected with a green network cable; the A11 and the B2 are disposed oppositely and both are respectively connected with a brown-white network cable; and the A12 and the B1 are disposed oppositely and both are respectively connected with a brown network cable. With the adoption of the double-backup circuit mode design of the PCB board and intrinsic characteristics of the Type-C interface, the front and reverse sides of the Type-C interface do not need to be distinguished and the plug may be directly inserted into the socket, thereby being convenient and quick. As shown in FIG. 5, a relevant PCB board as well as a pin contact plate 9 matching with the pins inside the USB interface on the socket is further disposed inside the socket.

Specifically, an encapsulation tail portion 7 with a protective effect is disposed at the junctions of the encapsulation portion 4 and the network cables 3, the encapsulation portion 4 and the encapsulation tail portion 7 are connected seamlessly, the encapsulation portion 4 and the encapsulation tail portion 7 are subject to low-pressure injection moulding, and in this embodiment, the network cables, the encapsulation portion of the plug and the encapsulation tail portion are encapsulated together, so that the production procedures are greatly simplified. The encapsulation portion 4 is made of a plastic or other high molecular materials and is not limited to an LDPE material, and a protective layer is disposed on an outer surface of the encapsulation portion 4. In this embodiment, the protective layer is made of a TPE material, the encapsulation portion 4 is made of the LDPE material, the protective layer and the encapsulation portion 4 both are subject to the low-pressure injection moulding, and the encapsulation tail portion 7 is also subject to the low-pressure injection moulding. Certainly, the protective layer, the encapsulation portion and the encapsulation tail portion may also not be subject to the low-pressure injection moulding. The low-pressure injection moulding in this embodiment mainly aims to implement secondary encapsulation and may ensure the product quality. For the overall encapsulated inner layer (encapsulation portion 4), the low-pressure injection moulding material is the LDPE and is soft, so the adverse effect of an injection moulding process to the welding quality can be eliminated. For the outer layer (protective layer), the low-pressure injection moulding material is the TPE and has high strength and good hand feeling, so that the connector can be fully protected and a convenience is provided for a plug operation. As shown in the figures, with the encapsulation tail portion 7, it may be ensured that the poor contact at the junctions in use, damage after long-time use and the like are prevented.

Apparently, the above embodiments of the present invention are merely examples to describe the present invention clearly and are not intended to limit the implementation manners of the present invention. A person of ordinary skill in the art may further make other changes or variations in a different form on the basis of the above description. Herein, examples are unnecessarily provided for all implementation manners. Any modification, equivalent replacement, improvement and the like made within the spirit and principle of the present invention should be included in a scope of protection of the claims of the present invention.

What is claimed is:

1. A network connection device, comprising: a plug and a socket, wherein the plug comprises a network cable, an encapsulation portion, and a Universal Serial Bus (USB) interface; one end of the encapsulation portion is connected with the network cable, and the other end of the encapsulation portion is connected with the USB interface; and the socket is matched with the USB interface; a Printed Circuit Board (PCB) is disposed inside the encapsulation portion; the PCB board is designed by adopting a double-backup circuit mode; the PCB board is designed in the double-backup circuit mode to respectively provide 12 pins on front and reverse sides, that is, the 12 pins on the front side of the PCB board comprise A1, A2, A3, A4, A5, A6, A7, A8, A9, A10, A11 and A1, and the 12 pins on the reverse side of the PCB board comprises B12, B11, B10, B9, B8, B7, B6, B5, B4, B3, B2 and B1: the A1 and the B12 are disposed oppositely and both are respectively connected with an orange-white wire; the A2 and the B11 are disposed oppositely and both are respectively connected with an orange wire; the A3 and the B10 are disposed oppositely, the A4 and the B9 are disposed oppositely and all are respectively connected with a green-white wire; the A5 and the B8 are disposed oppositely, the A6 and the B7 are disposed oppositely and all are respectively connected with a blue wire; the A7 and the B6 are disposed oppositely, the A8 and the B5 are disposed oppositely and all are respectively connected with a blue-white wire; the A9 and the B4 are disposed oppositely, the A10 and the B3 are disposed oppositely and all are respectively connected with a green wire; the A11 and the B2 are disposed oppositely and both are respectively connected with a brown-white wire; and the A12 and the B1 are disposed oppositely and both are respectively connected with a brown wire.

2. The network connection device according to claim 1, wherein the USB interface is a Type-C interface, and the socket is a Type-C interface socket.

3. The network connection device according to claim 1, wherein an encapsulation tail portion with a protective effect is disposed at the junctions of the encapsulation portion and the network cable.

4. The network connection device according to claim 3, wherein the encapsulation portion and the encapsulation tail portion are connected; and the encapsulation portion and the encapsulation tail portion are subject to low-pressure injection moulding.

5. The network connection device according to claim 1, wherein the network cable is a superfine network cable.

6. The network connection device according to claim 5, wherein an overall outer diameter of the network cable is 2-3 mm.

\* \* \* \* \*